United States Patent
Seo et al.

(10) Patent No.: US 10,933,773 B2
(45) Date of Patent: Mar. 2, 2021

(54) DOOR GARNISH FOR VEHICLE

(71) Applicants: Hyundai Motor Company, Seoul (KR); Kia Motors Corporation, Seoul (KR); SEOYON E-HWA CO., LTD., Seoul (KR)

(72) Inventors: Jae Sik Seo, Hwaseong-si (KR); Ji Hyun Cho, Cheonan-si (KR); Seong Kwon Go, Anyang-si (KR)

(73) Assignees: Hyundai Motor Company, Seoul (KR); Kia Motors Corporation, Seoul (KR); Seoyon E-Hwa Co., Ltd., Seoul (KR)

( * ) Notice: Subject to any disclaimer, the term of this patent is extended or adjusted under 35 U.S.C. 154(b) by 0 days.

(21) Appl. No.: 16/786,229

(22) Filed: Feb. 10, 2020

(65) Prior Publication Data
US 2021/0001754 A1    Jan. 7, 2021

(30) Foreign Application Priority Data
Jul. 4, 2019    (KR) .......................... 10-2019-0080878

(51) Int. Cl.
*F21V 19/00*    (2006.01)
*B60N 2/12*    (2006.01)
*B60Q 3/54*    (2017.01)
*G02B 5/00*    (2006.01)
*F21Y 115/10*    (2016.01)

(52) U.S. Cl.
CPC ............... *B60N 2/123* (2013.01); *B60Q 3/54* (2017.02); *F21V 19/0015* (2013.01); *G02B 5/003* (2013.01); *F21Y 2115/10* (2016.08)

(58) Field of Classification Search
None
See application file for complete search history.

(56) References Cited

U.S. PATENT DOCUMENTS 9,914,390 B1 *    3/2018 Salter .................... B60J 1/2086

* cited by examiner

*Primary Examiner* — Vip Patel
(74) *Attorney, Agent, or Firm* — Mintz Levin Cohn Ferris Glovsky; Peter F. Corless

(57) ABSTRACT

A door garnish for a vehicle includes a body part and an IMS module provided with a light source behind the body part including a transparent substrate so that light of the light source transmits the body part to be emitted to the outside, thereby displaying a certain shape of a button outside.

11 Claims, 4 Drawing Sheets

[FIG. 1]
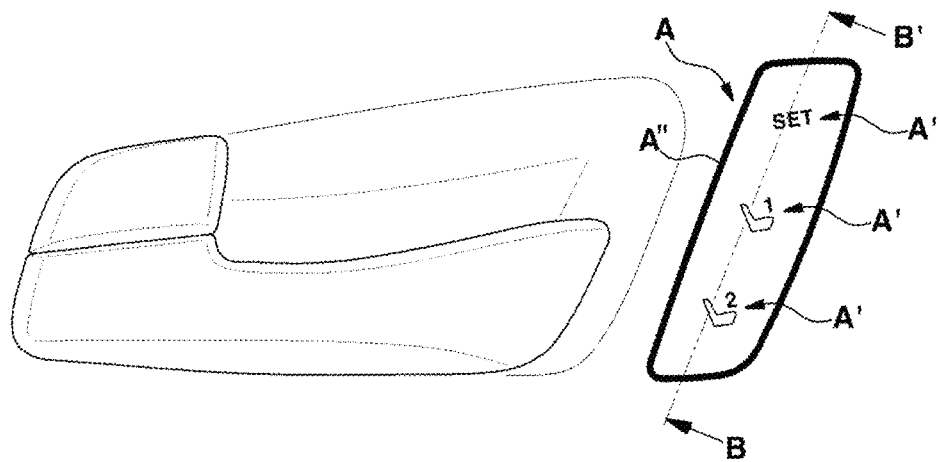
[FIG. 2]
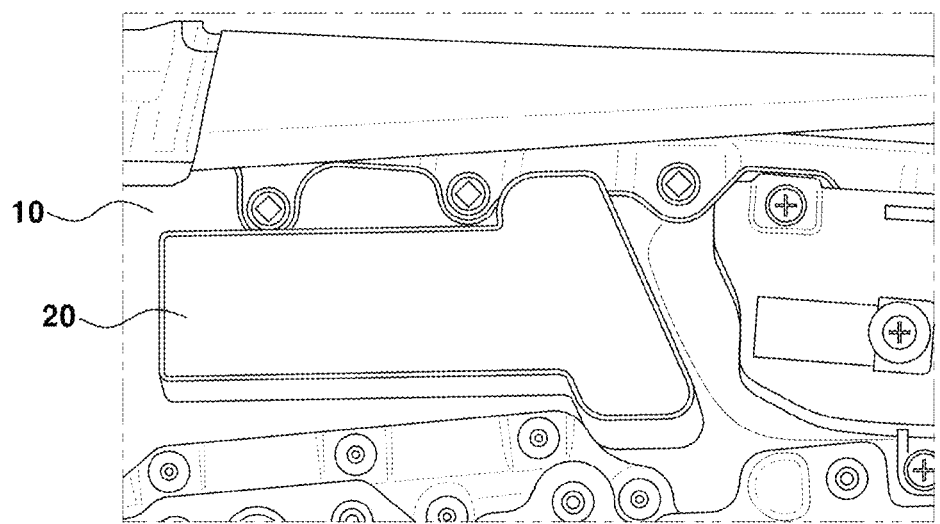

[FIG. 3]
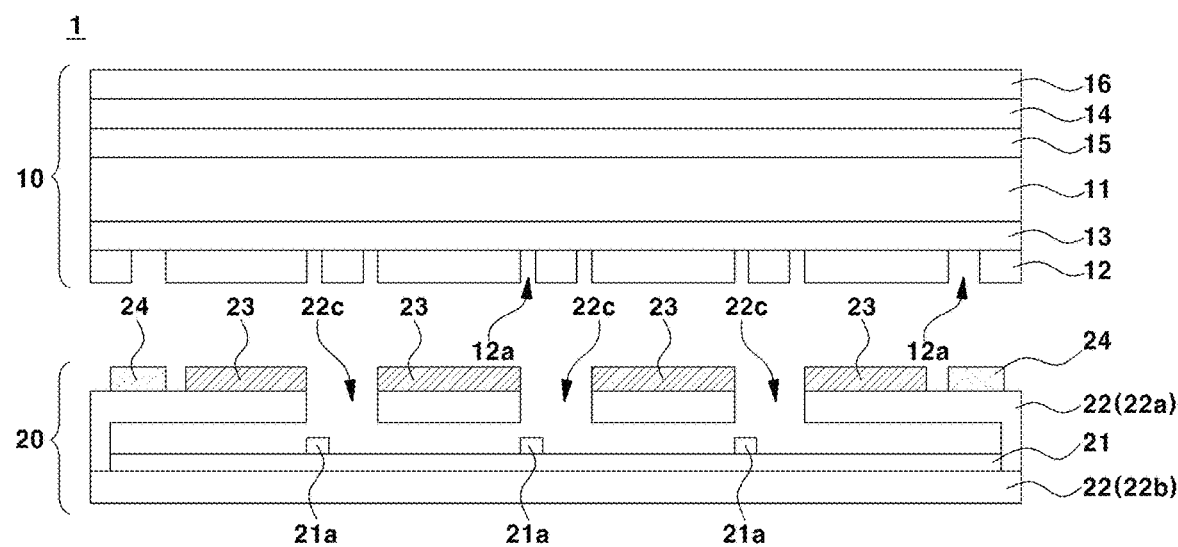
[FIG. 4]
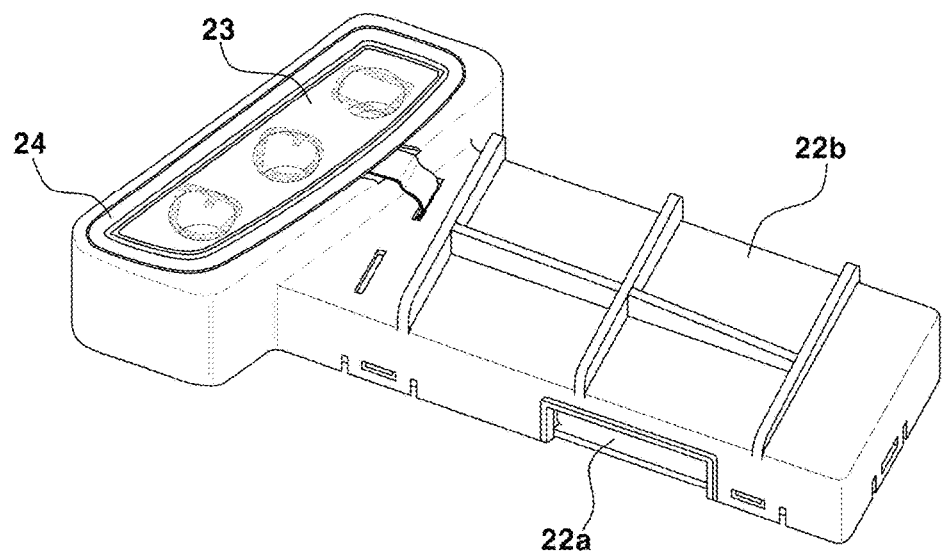

[FIG. 5]
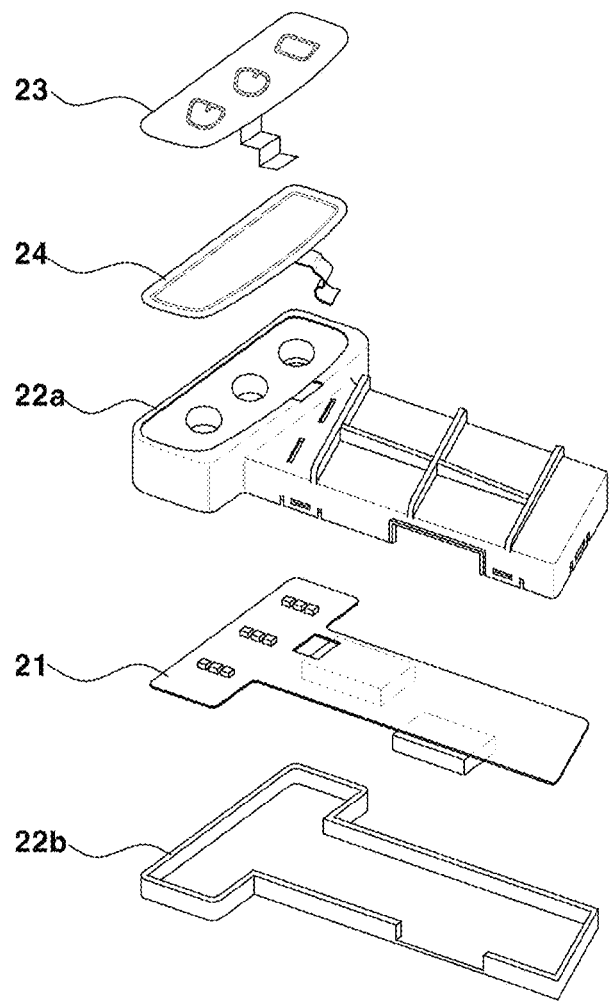
[FIG. 6]
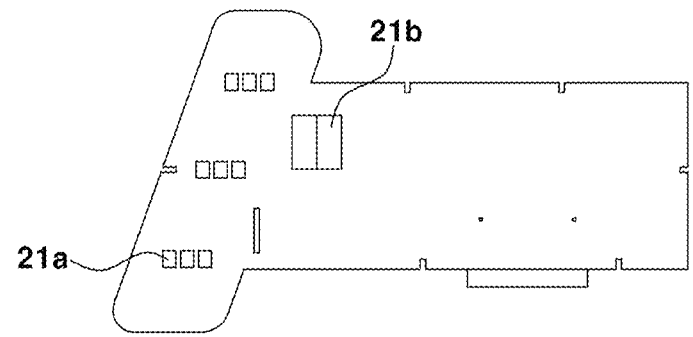

[FIG. 7]
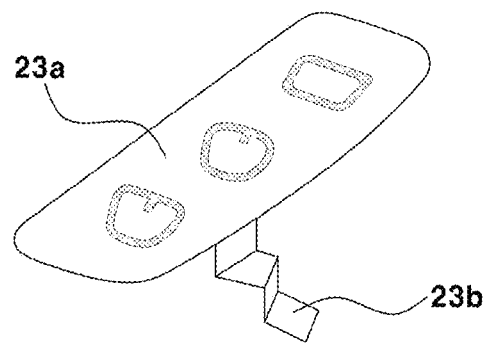
[FIG. 8A]
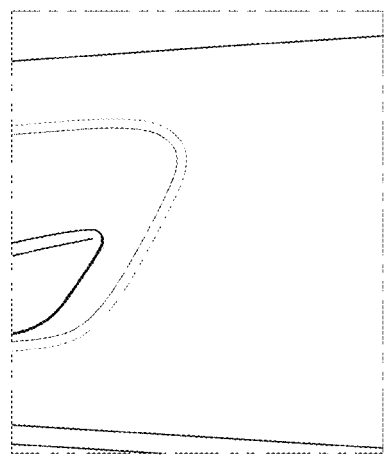
[FIG. 8B]
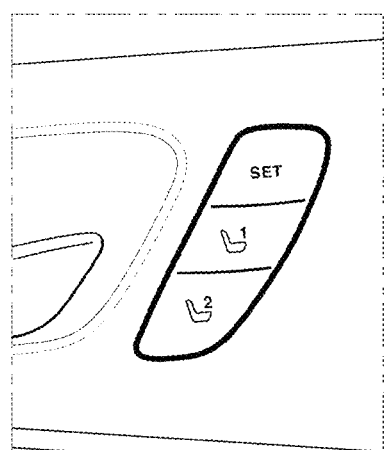

DOOR GARNISH FOR VEHICLE

CROSS-REFERENCE TO RELATED APPLICATION

This application claims under 35 U.S.C. § 119(a) the benefit of priority to Korean Patent Application No. 10-2019-0080878 filed on Jul. 4, 2019, the entire contents of which are incorporated herein by reference.

BACKGROUND

(a) Technical Field

The present disclosure relates to a door garnish for a vehicle.

(b) Background Art

An Integrated Memory System (IMS) function has a function of memorizing the optimum position in advance considering a driver's body shape, and returning a seat position to an initial position only by a simple button operation upon changing it. The an IMS module may be assembled with a door garnish, The disclosure of this section is to provide background information relating to the invention. Applicant does not admit that any information contained in this section constitutes prior art.

SUMMARY OF THE DISCLOSURE

Aspects of the present disclosure provide a single door garnish mold through the development of an IMS integrated garnish, and to enhance the merchantability by combining a touch button instead of a physical button and the hidden lighting effect. Aspects of the present disclosure provide a door garnish for a vehicle, in which an IMS module provided with a light source is located behind a body part including a transparent substrate so that light of the light source transmits the body part to be emitted to the outside, thereby displaying a certain shape of a button outside.

A door garnish according to an embodiment of the present disclosure includes a body part including a translucent transparent substrate, and a shielding coating layer provided behind the transparent substrate and having a certain shape of one or more holes; and an IMS module provided behind the body part and including a light source, and the light emitted from the light source may pass through the one or more holes and transmit the transparent substrate so that a symbol of a shape corresponding to the one or more holes is displayed outside.

In the door garnish, a plurality of symbols may be displayed outside.

In the door garnish, the rim surrounding the symbol may be further displayed.

The shielding coating layer may contain 4 wt % to 10 wt % of carbon black.

The body part may further include a white painting layer provided between the transparent substrate and the shielding coating layer, and containing an inorganic pigment to reflect the light emitted from the light source.

The body part may further include a high glossy painting layer provided in front of the transparent substrate and including a glossy paint; and a primer layer provided between the transparent substrate and the high glossy painting layer to enhance the adhesion of both layers.

The high glossy painting layer may have a light transmittance of 8% to 24%.

The IMS module may include a printed circuit board (PCB) having a plurality of light sources disposed on the front surface thereof; and a housing for receiving the PCB therein.

The housing may include a through hole formed to penetrate at the position corresponding to the plurality of light sources in the front surface thereof.

The IMS module may further include a touch film provided in front of the housing and for transferring a touch signal to the PCB, and the PCB may further include a control part for receiving the touch signal to operate the light source.

The IMS module may further include an Electroluminescent (EL) film provided at the outside of the touch film.

According to one embodiment, a door garnish of a vehicle for showing a symbol thereon, comprising: a body part comprising a transparent substrate, and a coating layer provided behind the substrate and having holes that form a symbol shape; and an driver seat memory module provided behind the body part and comprising a light source configured to emit light, wherein the light emitted from the light source passes through the holes and transmits to the transparent substrate so that the symbol shape corresponding to the holes is displayed.

According to the present disclosure, it is possible to operate both the IMS and non-IMS specifications by using only a single garnish mold.

Further, according to the present disclosure, it is not necessary to provide various molds such as buttons and cases by replacing the physical button with the touch button, and it is not necessary to perform securing moldability and reliability for each of the buttons.

Further, according to the present disclosure, it is possible to simultaneously implement the touch button and the lighting effects according to the situation where the needs for high-tech images are increasing, thereby contributing to enhance merchantability.

The effects of the present disclosure are not limited to the above-described effects. It should be understood that the effects of the present disclosure include all inferable effects in the following description.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given herein below by way of illustration only, and thus are not limitative of the present disclosure, and wherein:

FIG. 1 is a front diagram showing a door garnish according to the present disclosure.

FIG. 2 is a rear diagram showing the door garnish according to the present disclosure.

FIG. 3 is a cross-sectional diagram taken along the line B-B' of FIG. 1.

FIG. 4 is a perspective diagram of an IMS module according to the present disclosure.

FIG. 5 is an exploded perspective diagram of the IMS module according to the present disclosure.

FIG. 6 is a plane diagram showing a PCB included in the IMS module according to the present disclosure.

FIG. 7 is a plane diagram showing a touch film included in the IMS module according to the present disclosure.

FIGS. 8A and 8B are reference diagrams for explaining the operation state of the door garnish according to the present disclosure. FIG. 8A is a diagram showing a state where a light source has been turned off, and FIG. 8B is a diagram showing a state where the light source has been turned on.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

The above and other objects, features, and advantages of the present disclosure will be readily understood from the following preferred embodiments with reference to the accompanying drawings. However, the present disclosure is not limited to the embodiments described herein but may also be specified in other forms. Rather, the embodiments disclosed herein are provided so that the disclosed contents may be thorough and complete, and the spirit of the disclosure may be fully conveyed to those skilled in the art.

Like reference numerals have been used for like elements while describing each drawing. In the accompanying drawings, the dimensions of the structures are shown enlarged from the actual for the sake of clarity of the present disclosure. The terms first, second, etc. may be used to describe various components, but the components should not be limited by the terms. The terms are used only for the purpose of distinguishing one component from another component. For example, without departing from the scope of the present disclosure, a first component may be referred to as a second component, and similarly, the second component may also be referred to as the first component. The singular expressions include plural expressions unless the context clearly dictates otherwise.

In this specification, it should be understood that the terms "comprises" or "having", etc. refer to the presence of features, integers, steps, operations, components, parts, or combinations thereof described in the specification, but do not preclude the presence or addition possibility of one or more other features, integers, steps, operations, components, parts, or combinations thereof. Further, when a portion such as a layer, a film, an area, or a plate is referred to as being "on" another portion, this includes not only the case where it is "directly on" another portion, but also the case where there is another portion in between. On the contrary, when a portion such as a layer, a film, an area, or a plate is referred to as being "under" another portion, this includes not only the case where it is "directly underneath" another part but also there is another portion in between.

Unless otherwise specified, it should be understood that since all numbers, values, and/or representations that express components, reaction conditions, polymer compositions, and the amount of combinations used in the specification are approximations reflecting the various uncertainties of the measurement that occurs to obtain such values among essentially different ones by such numbers, they are expressed by the term "about" in all cases. Further, when a numerical range is disclosed in this specification, such a range is contiguous and includes all values from the minimum value of this range to the maximum value including the maximum value, unless otherwise indicated. Further, when such a range refers to an integer, all integers including from the minimum value to the maximum value including the maximum value are included unless otherwise indicated.

In general, an IMS module may be positioned inside the door and assembled with a door garnish. An IMS may be optionally provided or is not provided. Thus, the specification of the door garnish may depend on whether the IMS is provided or not, which may increase costs as separate investment costs may additionally incurred for making molds for making different garnishes. In order to construct an IMS system, costs for manufacturing different materials such as a button, a housing mold, and a surface treatment.

Further, mechanical buttons are not suitable for the latest technology trends such as an electric vehicle.

FIG. 1 is a front diagram showing an IMS display area (A) of a door garnish according to the present disclosure. FIG. 2 is a rear diagram showing the IMS display area (A) of the door garnish according to the present disclosure. FIG. 3 is a cross-sectional diagram taken along the line B-B' of FIG. 1.

Referring to FIG. 1, the IMS display area (A) of the door garnish may include a plurality of touch buttons (A') and a frame (A'') surrounding the touch button (A'). The shape and the number of the touch button (A') and the frame (A'') are not specially limited and may be appropriately adjusted according to the purpose.

The touch button (A') is provided such that light emitted from a light source of an IMS module is displayed to be shown from outside, and only the surface of the door garnish is normally displayed and the touch button (A') may be displayed at the moment of touching a proximity sensor or touch sensor or a portion of the sensor to be operated. However, the display format is not limited thereto and the touch button (A') may also be displayed in the IMS display area (A) at all times.

Referring to FIGS. 2 and 3, a door garnish 1 according to the present disclosure includes a body part 10 and an IMS module 20 provided behind the body part 10. Here, the IMS module 20 may be integrated by being directly or indirectly fastened with the body part 10.

The body part 10 may include a translucent transparent substrate 11 and a shielding coating layer 12 provided behind the transparent substrate 11, and the coating layer 12 having holes 12a that may form a certain shape, e.g., symbol.

The transparent substrate 11 may be made of a material and a thickness capable of transmitting light emitted from a light source 21a provided in the IMS module 20. Although not limited thereto, the transparent substrate 11 may be selected from a group consisting of polycarbonate, polymethylmethacrylate, glycol-modified polyethylene terephthalate, and a combination thereof.

The transparent substrate 11 may include an inorganic pigment for reflecting and/or diffusing the light emitted from the light source of the IMS module.

The shielding coating layer 12 may be formed in a black color so as to shield light in order to prevent light from spreading to portions other than the touch button (A') and the frame (A").

The shielding coating layer 12 includes the holes 12a, which may be formed by cutting portions of the layer material 12 corresponding to the shapes of the touch button (A') and the frame (A"). The holes 12a may be formed by a suitable method, and for example, formed by using a laser cutting apparatus. A portion of the light emitted from the light source described later may be emitted to the outside through the holes 12a. Other light is absorbed and/or blocked by the shielding coating layer 12 so that a certain shape of the display area (A) as in FIG. 1 may be displayed.

The shielding coating layer 12 may include 4 wt % to 10 wt % of carbon black in order to block the light. If the content of the carbon black is too small, the shielding rate may be lowered, and if it is too much, the appearance and the mechanical properties may be lowered.

The body part 10 may further include a white painting layer 13 provided between the transparent substrate 11 and the shielding coating layer 12.

The white painting layer 13 is configured to reflect the light emitted from the light source. For this purpose, the white painting layer 13 may include an inorganic pigment.

The inorganic pigment is not specially limited, and any material capable of reflecting light may be used. For example, titanium dioxide ($TiO_2$), etc. may be used.

The white painting layer 13 may contain 20 wt % to 30 wt % of the inorganic pigment. If the content of the inorganic pigment is too low, the degree of light diffusion may be insufficient, and if it is too much, the light transmittance may be lowered.

The body part 10 may further include a high glossy painting layer 14 provided in front of the transparent substrate 11 and a primer layer 15 provided between the transparent substrate 11 and the high glossy painting layer 14.

The high glossy painting layer 14 is a configuration for implementing a high-quality feeling by giving gloss to the door garnish 1.

The high glossy painting layer 14 may include a glossy paint. The paint contains a base resin, a curing agent, a pigment, a coloring agent, and a solvent, and may further contain additives according to the purpose. The content and type of each component are not specially limited and may be appropriately adjusted according to the purpose. However, it is preferable that the pigment is added with 3 wt % to 5 wt % for light transmission of the high glossy painting layer 14.

The light transmittance of the high glossy painting layer 14 may be 8% to 24%. If the light transmittance is too low, the light emitted from the light source may not be output to the extent identifiable by a driver, and if the light transmittance is too high, the internal structure may be projected, thereby lowering the feeling of high quality.

The body part 10 may further include a clear painting layer 16, which is a kind of protection layer, on the outermost portion thereof.

FIG. 4 is a perspective diagram of the IMS module 20. FIG. 5 is an exploded perspective diagram of the IMS module 20.

Referring to FIGS. 2, 4, and 5, the IMS module 20 may include a printed circuit board (PCB) 21 having a plurality of light sources 21a disposed on the front surface thereof, and a housing 22 for receiving the PCB 21 therein.

FIG. 6 is a plane diagram showing the PCB 21. Referring to FIG. 6, the plurality of light sources 21a are provided on the front surface of the PCB 21.

Although any of the light source 21a may be used as long as it may emit light, it is preferable to use an LED.

The light source 21a may be provided at the position corresponding to the touch button (A') of the IMS display area (A).

The housing 22 may include a front case 22a for providing a space capable of receiving the PCB 21 and a rear case 22b for shielding the open rear of the front case 22a.

The front case 22a may include a through hole 22c formed at the position corresponding to the light source 21a. Accordingly, the light emitted from the light source 21a may pass through the housing 22.

The IMS module 20 may include a touch film 23 provided in front of the housing 22 and for transferring a touch signal to the PCB 21.

FIG. 7 is a plane diagram showing the touch film 23. Referring to FIG. 7, the touch film 23 may include a touch part 23a for sensing a finger touch signal of a driver and a signal transfer part 23b formed to be protruded rearwards at one side of the touch part 23a to transfer the touch signal to the PCB 21.

The touch part 23a may be a shape that does not cover the through hole 22c formed to penetrate the front case 22a.

The signal transfer part 23b may be electrically connected with a control part 21b of the PCB 21. When the signal transfer part 23b transfers the touch signal generated from the touch part 23a to the control part 21b, the control part 21b operates the light source 21a so that the IMS display area (A) is displayed outside the door garnish 1.

At this time, when an Electroluminescent (EL) film is mounted to the rim of the touch film 23 to operate together with the light source 21a, the rim (A") may be displayed together with the touch button (A') as in FIG. 1.

FIGS. 8A and 8B are reference diagrams for explaining the operation state of the door garnish 1 according to the present disclosure. FIG. 8A is a diagram showing a state where the light source 21a has been turned off, and FIG. 8B is a diagram showing a state where the light source 21a has been turned on.

As in FIG. 8A, only the surface of the door garnish is normally displayed, and when the driver touches the display area (A) of the door garnish, the touch part 23a provided on the touch film 23 senses it and the signal transfer part 23b transfers the touch signal to the control part 21b of the PCB 21. The control part 21b operates the light source 21a provided on the front surface of the PCB 21. The light emitted from the light source 21a passes through the through hole 22c of the housing 22 and the holes 12a of the shielding coating layer 12, and transmits each layer of the body part 10 of the transparent substrate 11 to be emitted to outside. Accordingly, the IMS display area (A) is displayed outside the door garnish 1 as in FIG. 8B.

As described above, while the experimental example and the embodiments of the present disclosure have been specifically described, the scope of the present disclosure is not limited to the above-disclosed experimental example and embodiments, and various modifications and improvements of those skilled in the art using the basic concept of the present disclosure, which is defined in the appended claims, are also included in the scope of the present disclosure.

What is claimed is:

1. A door garnish, comprising:
a body comprising a translucent transparent substrate, and a shielding coating layer provided behind the transparent substrate and having a certain shape of one or more holes; and
an IMS module provided behind the body and comprising a light source configured to emit light,
wherein the light emitted from the light source passes through the one or more holes and transmits the transparent substrate so that a symbol of a shape corresponding to the one or more holes is displayed outside.

2. The door garnish of claim 1, wherein a plurality of symbols are displayed outside.

3. The door garnish of claim 1, wherein the rim surrounding the symbol is further displayed.

4. The door garnish of claim 1, wherein the shielding coating layer comprises 4 wt % to 10 wt % of carbon black.

5. The door garnish of claim 1, wherein the body further comprises a white painting layer provided between the transparent substrate and the shielding coating layer, and comprising an inorganic pigment to reflect the light emitted from the light source.

6. The door garnish of claim 1,
wherein the body further comprises a high glossy painting layer provided in front of the transparent substrate and comprising a glossy paint; and a primer layer provided between the transparent substrate and the high glossy painting layer to enhance the adhesion of both layers.

7. The door garnish of claim 6,
wherein the high glossy painting layer has a light transmittance of 8% to 24%.

8. The door garnish of claim 1,
wherein the IMS module comprises a printed circuit board (PCB) having a plurality of light sources disposed on the front surface thereof; and a housing for receiving the PCB therein.

9. The door garnish of claim 8,
wherein the housing comprises a through hole formed to penetrate at the position corresponding to the plurality of light sources in the front surface thereof.

10. The door garnish of claim 8,
wherein the IMS module further comprises a touch film provided in front of the housing and for transferring a touch signal to the PCB, and the PCB further comprises a control part for receiving the touch signal to operate the light source.

11. The door garnish of claim 10,
wherein the IMS module further comprises an Electroluminescent (EL) film provided at the outside of the touch film.

* * * * *